US012589472B2

(12) United States Patent
Mahot

(10) Patent No.: US 12,589,472 B2
(45) Date of Patent: Mar. 31, 2026

(54) METHOD FOR PERFORMING A SCREWING/UNSCREWING OPERATION COMPRISING A STEP OF DETERMINING THE MAXIMUM REBOUND SPEED OF THE ROTOR

(71) Applicant: ETABLISSEMENTS GEORGES RENAULT, Saint Herblain (FR)

(72) Inventor: Pierre Mahot, La Montagne (FR)

(73) Assignee: ETABLISSEMENTS GEORGES RENAULT, Saint Herblain (FR)

( * ) Notice: Subject to any disclaimer, the term of this patent is extended or adjusted under 35 U.S.C. 154(b) by 471 days.

(21) Appl. No.: 18/148,086

(22) Filed: Dec. 29, 2022

(65) Prior Publication Data

US 2023/0219201 A1 Jul. 13, 2023

(30) Foreign Application Priority Data

Dec. 30, 2021 (FR) ...................................... 2114702

(51) Int. Cl.
B25B 21/02 (2006.01)
B25B 23/147 (2006.01)
(Continued)

(52) U.S. Cl.
CPC ........ B25B 21/026 (2013.01); B25B 23/1475 (2013.01); H02P 21/18 (2016.02);
(Continued)

(58) Field of Classification Search
CPC ... B25B 21/026; B25B 23/1475; H02P 21/18; H02P 21/22; H02P 21/36; H02P 2207/05
See application file for complete search history.

(56) References Cited

U.S. PATENT DOCUMENTS 4,287,956 A * 9/1981 Maurer ................. B25B 21/026
173/93.5
4,609,089 A * 9/1986 Kobayashi .......... B25B 23/1453
173/183
(Continued)

FOREIGN PATENT DOCUMENTS

| CN | 205148183 U | 4/2016 |
| CN | 105345715 B | 3/2017 |
| EP | 3653339 B1 | 8/2021 |

OTHER PUBLICATIONS

English translation of the French Written Opinion dated Aug. 10, 2022 for corresponding French Application No. 2114702, filed Dec. 30, 2021.
(Continued)

*Primary Examiner* — Dariush Seif
(74) *Attorney, Agent, or Firm* — David D. Brush; Westman, Champlin & Koehler, P.A.

(57) ABSTRACT

A method for controlling torque applied during a screw driving operation using a screw driving device. The device includes: an electric motor provided with a rotor; an output member capable of being rotated; and a rebounding impact mechanism rigidly connected to the rotor and to the output member. The method includes power supplying the motor inducing driving the impact mechanism by the rotor and periodically rotating the output member by the impact mechanism; driving the impact mechanism generating a plurality of successive impacts at the end of each of which the rotor rotates in a rebound in the opposite direction to the screw driving operation; determining a maximum rotational frequency reached by the rotor during the rebound following each of the impacts; and stopping the screw driving operation when the maximum rotational frequency reaches a predetermined threshold corresponding to a predetermined torque level.

24 Claims, 7 Drawing Sheets

(51) Int. Cl.
  *H02P 21/18* (2016.01)
  *H02P 21/22* (2016.01)
  *H02P 21/36* (2016.01)
(52) U.S. Cl.
  CPC .............. *H02P 21/22* (2016.02); *H02P 21/36*
  (2016.02); *H02P 2207/05* (2013.01)

(56) References Cited

U.S. PATENT DOCUMENTS

| | | | | |
|---|---|---|---|---|
| 11,633,845 B2 * | 4/2023 | Wu | ...................... | B25B 21/004 |
| | | | | 173/213 |
| 12,220,790 B2 * | 2/2025 | Nakahara | .................. | B25F 5/00 |
| 2002/0134172 A1 * | 9/2002 | Yamada | .............. | B25B 23/1405 |
| | | | | 73/862.21 |
| 2008/0099217 A1 * | 5/2008 | Seith | .................... | B25B 21/026 |
| | | | | 173/1 |
| 2008/0297080 A1 * | 12/2008 | Bosch | .................. | B25B 21/008 |
| | | | | 318/400.14 |
| 2009/0250233 A1 * | 10/2009 | Wallace | .............. | B25B 23/1405 |
| | | | | 173/183 |
| 2015/0165604 A1 * | 6/2015 | Bartoszek | ............... | B25B 21/02 |
| | | | | 173/1 |
| 2016/0354905 A1 * | 12/2016 | Ely | ........................ | B25B 21/008 |
| 2019/0030696 A1 * | 1/2019 | Seith | ........................ | B25B 21/02 |
| 2019/0321958 A1 * | 10/2019 | Cooper | ................. | B25B 21/026 |
| 2020/0112283 A1 * | 4/2020 | Mahot | ................... | B25B 21/026 |
| 2020/0180128 A1 * | 6/2020 | Schneider | ............ | B25D 11/068 |
| 2021/0187708 A1 * | 6/2021 | Beguin | ............... | B25B 23/1475 |
| 2023/0219201 A1 * | 7/2023 | Mahot | ................ | B25B 23/1475 |
| | | | | 81/464 |

OTHER PUBLICATIONS

French Search Report and Written Opinion dated Aug. 10, 2022 for corresponding French Application No. 2114702, filed Dec. 30, 2021.

* cited by examiner

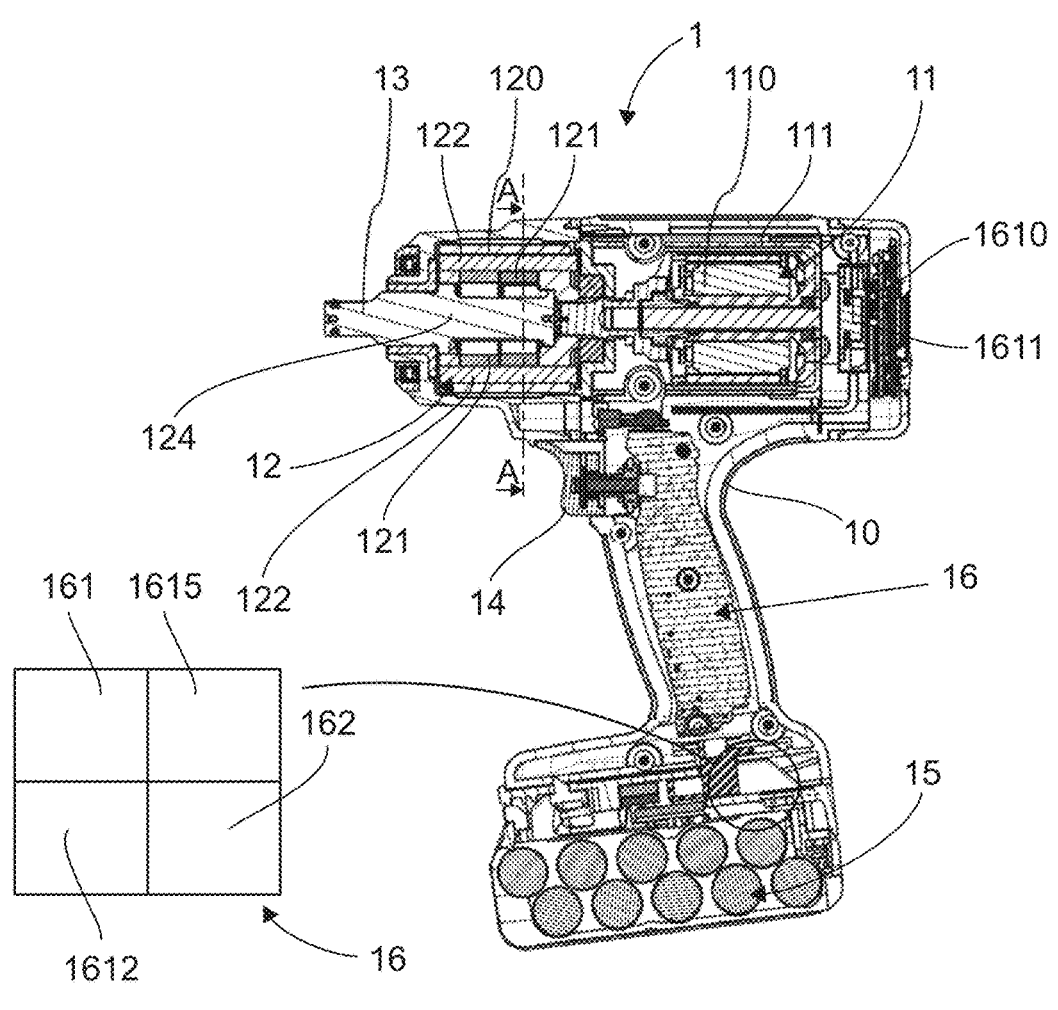
Fig. 1
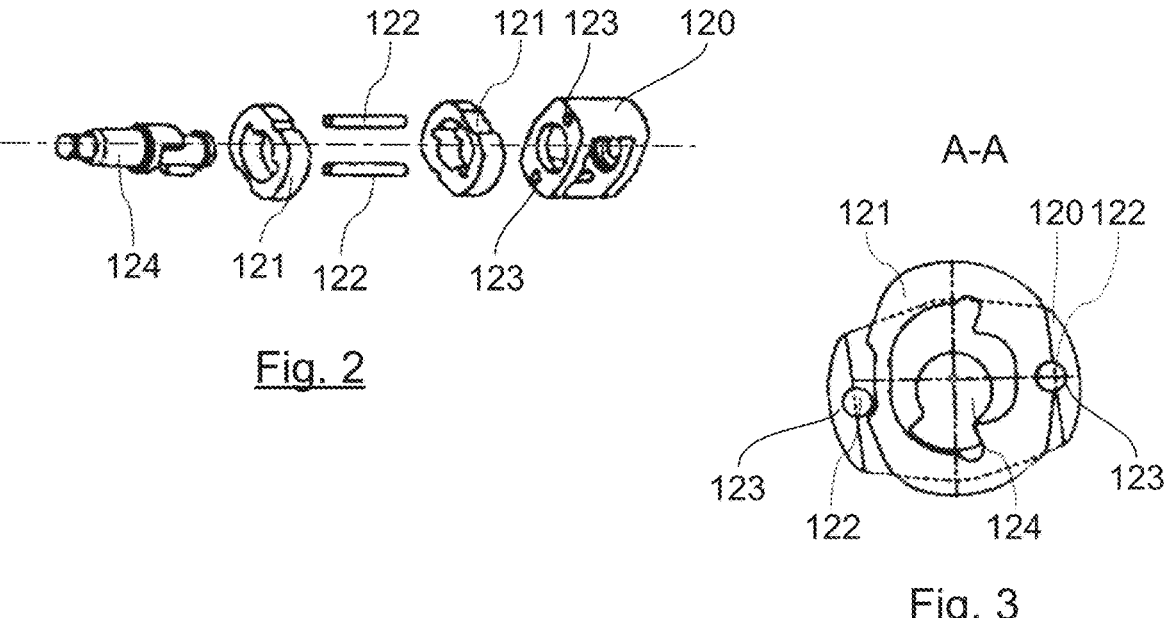
Fig. 2
A-A
Fig. 3

METHOD FOR PERFORMING A SCREWING/UNSCREWING OPERATION COMPRISING A STEP OF DETERMINING THE MAXIMUM REBOUND SPEED OF THE ROTOR

1. FIELD OF THE DISCLOSURE

The field of the disclosure is that of the design of electric impact screw driving (screwing/unscrewing) devices, also called impact wrenches, comprising a rebounding impact mechanism.

The disclosure also relates to driving such screw driving devices, and more particularly the control, that is to say monitoring of the level of tightening of the shock or impact screw driving devices and their stoppage when the desired torque level is reached.

2. PRIOR ART

Impact wrenches are commonly used in various sectors to work on performing screw driving operations of assemblies.

Interest is paid here to electric impact wrenches with a rebounding impact mechanism, the impact mechanism of which is rigidly connected on the one hand to the rotor of the motor of the wrench and on the other hand to the output member able to rotate an element for driving an element to be screwed.

Impact wrenches with rebounding impact mechanism comprise an impact mechanism inducing, on each impact, a rebound of the motor rotor in the opposite direction to the working direction (screwing or unscrewing direction).

The working direction corresponds to the clockwise direction seen from the rear of the tool in the case of screwing a right-hand-threaded screw, or the counter-clockwise direction in the case of unscrewing a right-hand-threaded screw.

The working direction corresponds to the counter-clockwise direction in the case of screwing a left-hand-threaded screw, or the clockwise direction in the case of unscrewing a left-hand-threaded screw.

These impact wrenches with rebounding impact mechanism include:

Maurer-type impact mechanisms: Twin Hammer, Twin lobe, double dogs;
single dog;
rocking dog;
two jaws;
pin clutch;
. . .

European patent EP-B1-3 653 339 describes an electric impact wrench with a rebounding impact mechanism.

When performing a screw driving operation, it is often desired to tighten the assembly to a given tightening torque. Generally, impact wrenches do not incorporate means for measuring the tightening torque. Sometimes, the control means are able to count the number of impacts and stop the screwdriver when this number reaches a predetermined threshold. More rarely, some impact wrenches comprise means for measuring the tightening torque delivered at the output member and control means for stopping the screw driving operation when the tightening torque reaches the desired value.

Such approaches are efficient and generally give satisfactory results in terms of reliability.

However, it is possible to further improve the accuracy of electric impact wrenches with a rebounding impact mechanism.

3. SUMMARY

For this purpose, an exemplary embodiment of the present disclosure proposes a method for controlling the torque applied during a screw driving operation by means of a screw driving device comprising:

an electric motor provided with a rotor;
an output member capable of being rotated;
a rebounding impact mechanism rigidly connected to said rotor and to said output member, said method comprising power supplying said motor inducing driving said impact mechanism by said rotor and periodically rotating said output member by said impact mechanism, driving said impact mechanism generating the occurrence of a plurality of successive impacts at the end of each of which said rotor rotates in a rebound in the opposite direction to the screwing/unscrewing operation.

According to an exemplary embodiment of the present disclosure, such a method comprises:

a step of determining a maximum rotational frequency reached by said rotor during the rebound following the occurrence of each of said impacts in said impact mechanism, and
a step of stopping said screw driving operation when said maximum rotational frequency reaches a predetermined threshold corresponding to a predetermined torque level.

Thus, an exemplary embodiment of the present disclosure consists in determining, during each rebound, the maximum rebound frequency of the rotor and comparing this maximum frequency with a predetermined threshold corresponding to a predetermined tightening torque, then stopping the screw driving device when this threshold is reached. It is thus possible to control a screw driving operation without measuring the tightening torque.

According to a possible variant, said step of determining a maximum rotational frequency comprises a step of determining an instantaneous rotational frequency reached by said rotor during the rebound following the occurrence of each of said impacts in said impact mechanism, said maximum rotational frequency corresponding to the maximum value of the instantaneous rotational frequency following each impact.

According to a possible variant, said step of determining a maximum rotational frequency reached by the rotor during the rebound of said rotor comprises measuring said rotational frequency by means of a speed sensor.

According to a possible variant, said step of determining a maximum rotational frequency reached by said rotor during the rebound comprises:

a step of measuring the angle of rotation of said rotor as a function of time by means of an angle sensor, and
a step of determining the time derivative of the angle measured in said step of measuring the angle.

According to a possible variant, the power supply of said motor implements means for controlling the power supply of the motor, said step of determining said maximum rebound rotational frequency of said rotor comprising:

a step of extracting and/or calculating physical quantities from said power supply control means, and a step of determining said maximum rebound rotational frequency of said rotor taking into account said extracted and/or calculated physical quantities.

According to a possible variant, said power supply of said motor implements a vector control generating two voltage setpoints Ud and Uq from a current setpoint Id, a current setpoint Iq, a measurement of the three phase currents Ia, Ib and Ic and a measurement of the angular position of the rotor.

According to a possible variant, said power supply of said motor implements a BLDC control.

According to a possible variant, said power supply of said motor implements a sine control.

According to a possible variant, said vector control comprises:

the calculation of Clarke/Park transforms from said phase currents Ia, Ib and Ic and the angular position of the rotor giving as a result two intensities Iq, Id, the extraction of at least one of said voltage setpoints Ud or Uq, said step of determining said maximum rebound rotational frequency of said rotor taking into account said intensities Id, Iq and at least one of said voltage setpoints Ud or Uq.

According to a possible variant, said vector control comprises:

the calculation of an inverse Park transform of said voltage setpoints Uq and Ud giving as a result voltages Uα and Uβ, and the calculation of a Clarke transform of said phase currents Ia Ib and Ic giving as a result intensities Iα and Iβ, said step of determining said maximum rebound rotational frequency of said rotor taking into account said voltages Uα and Uβ and said intensities Ia and IB.

According to a possible variant, said motor is a DC motor and said extracted and/or calculated physical quantities comprising:

the applied or measured current flowing in said motor, the voltage applied or measured at the terminals of said motor.

According to a possible variant, said motor is three-phase and said extracted and/or calculated physical quantities comprising:

at least two of the currents applied or measured in the phases of said motor, voltages applied or measured at the phases of said motor.

According to a possible variant, a method according to an exemplary embodiment of the present disclosure comprises, at a given instant, the implementation of several steps of determining said rebound speed, said determination steps being of different natures, and a step of merging the results obtained by the implementation of each of said steps of different nature of determining said rebound speed.

An exemplary embodiment of the present disclosure also relates to a device for controlling the torque applied by a screw driving device allowing to perform screw driving operations, said screw driving device comprising:

an electric motor provided with a rotor;

an output member capable of being rotated;

a rebounding impact mechanism rigidly connected to said rotor and to said output member, said control device comprising means for controlling the power supply of said motor able to induce driving said impact mechanism by said rotor and periodically rotating said output member by said impact mechanism, driving said impact mechanism generating the occurrence of a plurality of successive impacts at the end of each of which said rotor rotates in a rebound in the opposite direction to the screwing/unscrewing operation.

According to an exemplary embodiment of the present disclosure, said device comprises:

means for determining a maximum rotational frequency reached by said rotor during the rebound following the occurrence of each of said impacts in said impact mechanism, and control means able to generate the stoppage of a screw driving operation in progress when said maximum rotational frequency reaches a predetermined threshold corresponding to a predetermined torque level.

According to a possible variant, said means for determining a maximum rotational frequency comprise means for determining an instantaneous rotational frequency reached by said rotor during the rebound following the occurrence of each of said impacts in said impact mechanism, said maximum rotational frequency corresponding to the maximum value of the instantaneous rotational frequency following each impact.

According to a possible variant, said means for determining a maximum rotational frequency reached by the rotor during the rebound of said rotor comprise a speed sensor.

According to a possible variant, said means for determining a maximum rotational frequency reached by said rotor during the rebound comprise:

means for measuring the angle of rotation of said rotor as a function of time, and means for determining the time derivative of the angle measured in said step of measuring the angle.

According to a possible variant, said means for determining said maximum rebound rotational frequency of said rotor comprise means for extracting and/or calculating physical quantities from said power supply control means, said means for determining said maximum rebound rotational frequency of said rotor being capable of determining said maximum rotational frequency taking into account said extracted and/or calculated physical quantities.

According to a possible variant, said means for controlling the power supply of said motor implement a vector control capable of generating two voltage setpoints Ud and Uq from a flow setpoint Id and a torque setpoint Iq, and three phase currents Ia, Ib and Ic from said voltage setpoints Ud and Uq.

According to a possible variant, said means for controlling the power supply of said motor implement a BLDC control.

According to a possible variant, said means for controlling the power supply of said motor implement a sine control.

According to a possible variant, said vector control comprises means for calculating Clarke/Park transforms from said phase currents Ia, Ib and Ic giving as a result two intensities Iq, Id, said calculation and/or extraction means being capable of extracting at least one of said voltage setpoints Ud or Uq, said means for determining said maximum rebound rotational frequency of said rotor being capable of determining said maximum rotational frequency taking into account said intensities Id, Iq and at least one of said voltage setpoints Ud or Uq.

According to a possible variant, said vector control comprises means for calculating an inverse Park transform of said voltage setpoints Uq and Ud giving as a result voltages Uα and Uβ, and means for calculating a Clarke transform of said phase currents Ia Ib and Ic resulting in intensities Ia and IB, said means for determining said maximum rebound rotational frequency of said rotor being capable of determining said maximum rotational frequency taking into account said voltages Uα and Uβ and said intensities Ia and IB.

According to a possible variant, said motor being a DC motor and said physical quantities extracted and/or calculated by said calculation and/or extraction means comprising:
the applied or measured current flowing in said motor,
the voltage applied or measured at the terminals of said motor.

According to a possible variant, said motor being three-phase and said physical quantities extracted and/or calculated by said calculation and/or extraction means comprising:
at least two of the currents applied or measured in the phases of said motor,
voltages applied or measured at the phases of said motor.

An exemplary embodiment of the present disclosure also relates to a screw driving device comprising:
an electric motor provided with a rotor;
an output member capable of being rotated;
a rebounding impact mechanism rigidly connected to said rotor and to said output member, said device comprising a control device according to any one of the above variants.

An exemplary embodiment of the present disclosure also relates to a computer program product comprising code instruction lines allowing the execution of a method according to any one of the above variants when it is read by a computer.

4. DESCRIPTION OF THE FIGURES

Other features and advantages of the disclosure will appear upon reading the following description of particular embodiments, given by way of simple illustrative and non-limiting example, and the appended drawings, among which:

FIG. 1 illustrates a longitudinal sectional view of an example of an impact wrench according to an exemplary embodiment of the present disclosure;

FIG. 2 shows an exploded view of the impact mechanism of the impact wrench shown in FIG. 1;

FIG. 3 illustrates a sectional view along the axis A-A of FIG. 1;

Figure 4:
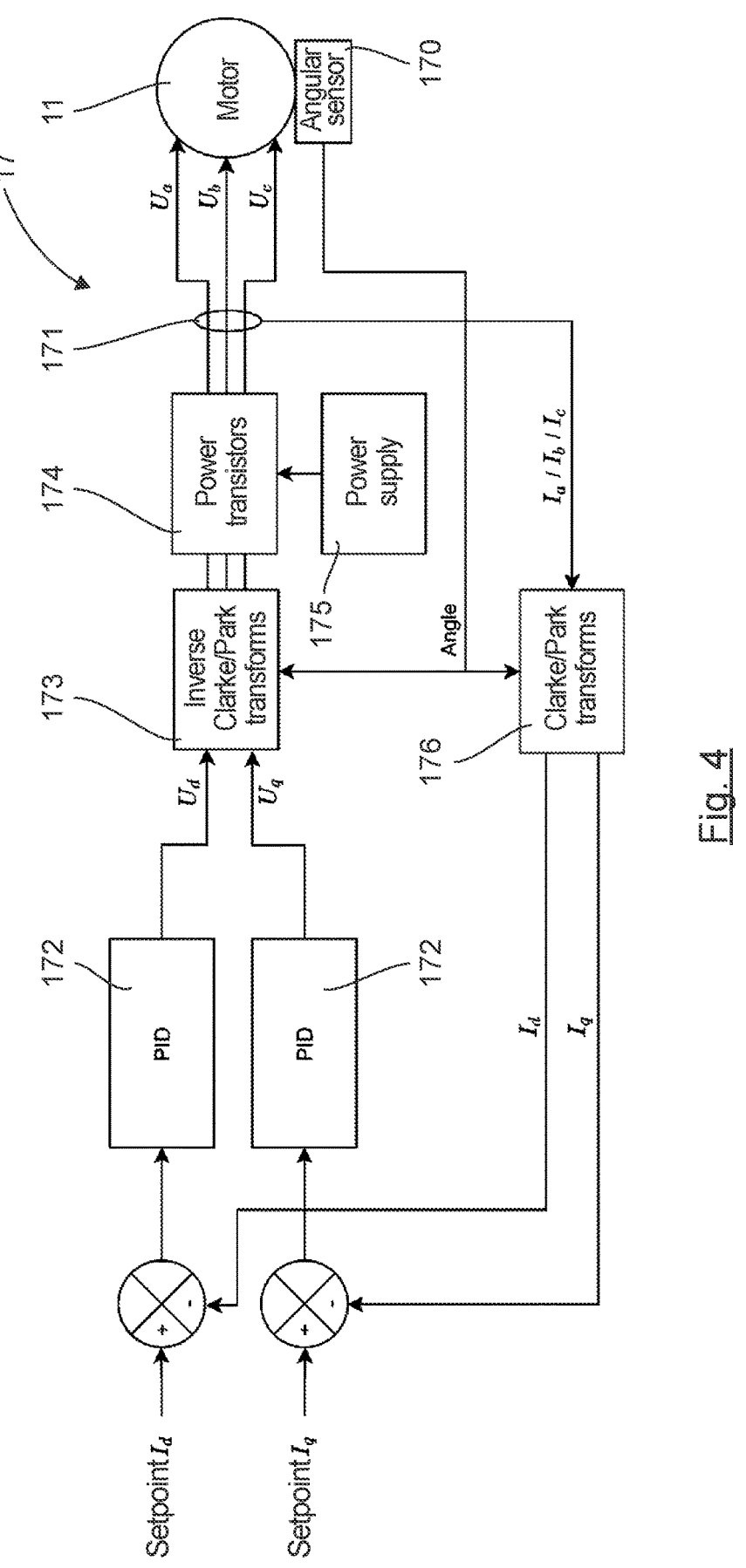
FIG. 4 illustrates the diagram of a vector control.
Figure 5:
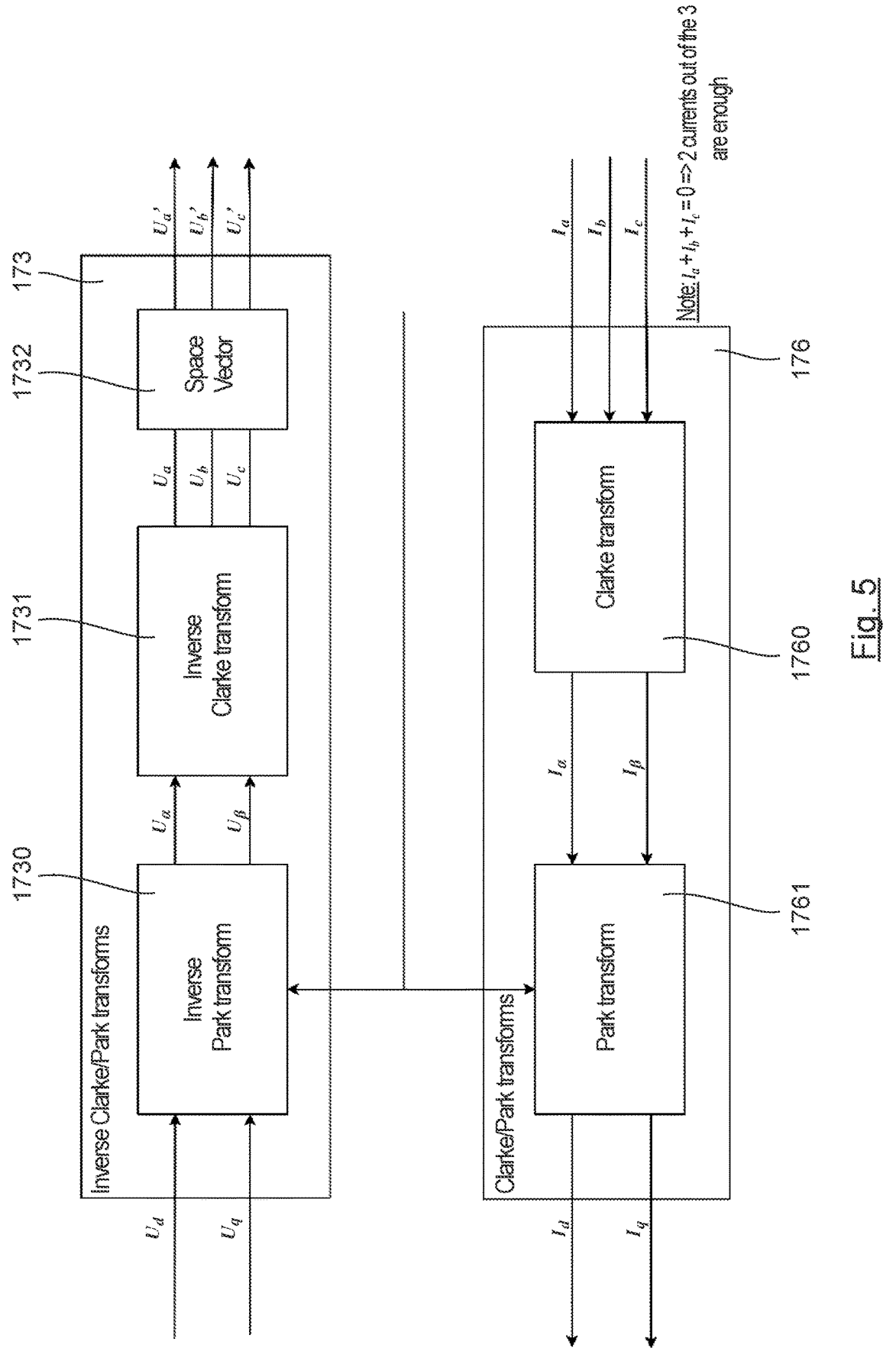
FIG. 5 illustrates a detail of the vector control shown in FIG. 4.

5. DESCRIPTION OF PARTICULAR EMBODIMENTS 5.1. Architecture

An example of an impact wrench according to an embodiment of the present disclosure comprising a device for controlling the applied torque is presented in rotation with FIGS. 1 to 10.

Such an impact wrench 1 comprises a casing 10 housing an electric motor 11, an impact mechanism 12 and a rotary output member 13 provided to cooperate with a screw driving socket. The impact wrench comprises an actuating trigger 14.

The motor 11 comprises a rotor 111 and a stator 110. It is an electric motor. The motor will preferably be of the synchronous type with permanent magnets. It could alternatively be any other type of electric motor such as a DC motor, an asynchronous motor, a variable reluctance motor, a stepper motor, . . . . It could be a single or multi-phase motor.

The rotor 111 is connected directly to the input of the impact mechanism 12. In other words, the transmission ratio between the rotor and the input of the impact mechanism 12 is equal to 1.

The impact mechanism 12 is of the rebounding type. As will emerge more clearly later, this is a rebounding impact mechanism of the Maurer type. However, it could be any other rebounding impact mechanism such as, for example, and without limitation:
single dog;
rocking dog;
two jaws;
pin clutch;
hydraulic block;
. . .

The impact mechanism 12 comprises a cage 120 movable in rotation in direct contact with the rotor 111 to which it is connected in rotation. The connection is therefore rigid between the rotor and the cage.

The cage 120 is hollowed out and houses two hammers 121 secured thereto in a manner that can move in rotation about axes substantially parallel to the axis of rotation of the bell by means of pins 122 fitted into holes 123 provided for this object in the bell 120.

The impact mechanism 12 comprises an output square 124, extending partly inside the hammers 121 and the bell 120. The output square 124 is connected in rotation with the rotary output member 13.

Conventionally, the bell 120 rotated directly by the motor 11 moves the hammers 121 which pivot around the pins 122 and simultaneously knock against anvils rigidly connected to the output shaft 124 to transmit the kinetic energy contained in the moving parts (rotor 111, cage 120, hammers 121) to the output square 124 in shocks and rotate the latter.

Generally speaking, a rebounding impact mechanism comprises:
a flywheel (here by the cage 120);
anvils (connected to the output square 124);
a device for mechanical connection between the flywheel and the anvil (here the hammers 121).

The impact wrench comprises a battery 15, to power supply the motor 11 with electric current. In variants, the impact wrench may not comprise a battery but a cable for connection to the mains or for connection to a controller itself connected to the mains. The sector could for example be an alternative distribution network. The battery, the controller or the mains are a source of electrical voltage.

The impact wrench conventionally comprises means for controlling the power supply of the motor 16 able to induce driving the impact mechanism by the rotor and periodically rotating the output member by the impact mechanism.

The drive of the impact mechanism generates the occurrence of a plurality of successive impacts at the end of each of which the rotor rotates in a rebound in the opposite direction to the screwing/unscrewing operation in progress.

More specifically, during a screw driving operation, the power supply control means of the motor power supply the motor in the screwing direction either continuously if the motor is current controlled according to the technique described in patent EP-B1-3 653 339 or periodically. A succession of impact cycles then occurs until the screw driving operation ends.

During each impact cycle, the bell 120 rotated directly by the motor 11 moves the hammers 121 which pivot around the pins 122 and simultaneously knock against anvils rigidly connected to the output shaft 124 to transmit the kinetic energy contained in the moving parts (rotor 111, cage 120, hammers 121) to the output square 124 in a shock and cause it to rotate. The output square, that is to say the output device, thus transmits a torque to the element to be screwed.

During each impact in the impact mechanism, the transmission between the motor and the output square deforms and accumulates potential deformation energy under the effect of the torque developed during the impact. When the torque transmitted to the element to be screwed becomes insufficient to continue to rotate the element to be screwed, the transmission relaxes and the potential deformation energy accumulated in the transmission is reconverted into kinetic energy which causes the impact mechanism and the rotor to rotate in the unscrewing direction in a rebound during which the rotor reaches a maximum rotational frequency at the end of the expansion.

By assimilating the impact wrench to a spring (anvil+output square) and a flywheel, there is a proportional relationship between the torque applied to the element to be screwed during the impact and the maximum rotational frequency reached at the end of the rebound. Indeed, the torque C delivered by the impact wrench varies linearly during an impact as a function of the transmission deformation angle $\alpha$ according to a formula:

$$C = k \cdot \alpha.$$

where:

k is a constant corresponding to the stiffness of the transmission a is the relaxation angle which corresponds to the angle of rotation of the transmission in the opposite direction to the screwing/unscrewing operation after the element to be screwed is blocked following a shock.

The potential deformation energy Ep accumulated during the impact can therefore be expressed as follows:

$$Ep = (C \cdot \alpha)/2$$

$$Ep = (C^2/k)/2$$

$$Ec = (J \cdot \omega^2)/2$$

Then $$Ec = \mu \cdot Ep$$

where:

J is the inertia of the rotor along its axis of rotation $\mu$ is the efficiency of restitution of the potential energy into kinetic energy $\omega$ is the maximum rotational frequency of the rotor at the end of the rebound Ec is the kinetic energy of the rotor at the end of transmission expansion $\mu$ is the transmission efficiency It follows that:

$$\mu \cdot (C^2/k)/2 = J \cdot \omega^2/2$$

$$C = \omega \cdot (J \cdot k/\mu)^{1/2}$$

If J, u and K are considered to be constant, the tightening torque C is proportional to the maximum rebound frequency $\omega max$ at the end of the rebound. There is therefore a proportional relationship between the torque delivered by the impact wrench during an impact and the maximum rotational frequency reached at the end of the rebound.

It is thus possible to define a predetermined threshold of maximum rebound rotational frequency of the rotor $\omega fin$ which corresponds to a given tightening torque, in other words to a predetermined torque level, delivered by the impact wrench and to secure the end of a screw driving operation from damage by the rebound speed of the rotor of this predetermined threshold of maximum rebound rotational frequency. This threshold of maximum rebound rotational frequency of the rotor can be determined experimentally by recording during a test the value of the maximum rebound frequency of the rotor at the end of the impact that allowed to tighten the assembly at the desired torque. Such a calibration method will allow to match a torque measured by the tool with a torque measured by a reference sensor. Alternatively, this threshold can be determined by calculation.

According to an exemplary the principle of an exemplary embodiment of the present disclosure, the control of the rotational frequency of the rotor during rebound thus allows to carry out a tightening at a given torque without however having to measure during a screw driving operation the tightening torque delivered by the impact wrench.

This approach is particularly advantageous in that it can be implemented in impact wrenches that do not comprise a tightening torque sensor, which constitutes the majority of impact wrenches. Furthermore, impact wrenches implementing tightening torque sensors are small in size, allowing only low tightening torques to be achieved. Thus, the approach according to an exemplary embodiment of the present disclosure can be put in any impact wrench regardless of its capacity in terms of tightening torque. The technique according to an exemplary embodiment of the present disclosure also allows to provide impact wrenches that are more robust than those using tightening torque sensors which generally have a fairly low resistance to shocks induced in the striking mechanism. The technique according to an exemplary embodiment of the present disclosure also has the advantage of being compact and less expensive since it does not require the implementation of a bulky and expensive torque sensor. The technique according to an exemplary embodiment of the present disclosure also has the advantage of being simple.

Thus, the control means comprise:

means 161 for determining the maximum rotational frequency reached by the rotor during the rebound following the occurrence of each of the impacts in the impact mechanism, and control means 162 capable of generating the stoppage of the screw driving operation in progress when the maximum rotational frequency reaches a predetermined threshold of rebound rotational frequency $\omega fin$.

Stopping the screw driving operation in progress can, for example, correspond to a power cut to the motor, whether or not preceded by the generation of a power supply setpoint inducing motor braking.

A device according to an exemplary embodiment of the present disclosure could alternatively or in addition comprise means for displaying the torque actually reached at the end of a screw driving operation in progress. This torque actually reached will a priori be slightly greater than the expected torque corresponding to the maximum speed measured.

i. Variant with Speed Sensor

According to a first variant, the means 161 for determining a maximum rotational frequency reached by the rotor during the rebound of the rotor comprise a speed sensor 1610.

It could preferably be a tachometer generator driven by the rotor and delivering an electrical voltage whose value is proportional to the rotational frequency of the rotor.

The means 161 for determining the maximum rotational frequency reached by the rotor during the rebound are configured to record at each impact the maximum rebound frequency of the rotor ωmax, compare it to the predetermined threshold ωfin of rebound rotational frequency and to stop the screw driving operation in progress when this threshold is reached.

ii. Variant with Angle Sensor

According to a second variant, the means 161 for determining a maximum rotational frequency reached by the rotor during the rebound of the rotor comprise:

means 1611 for measuring the angle of rotation of the rotor as a function of time, and means 1612 for determining the time derivative of the angle thus measured which corresponds to the rotational frequency of the rotor.

The angle sensor could for example be:

a hall effect sensor;

a resolver;

one or more on/off hall effect magnet(s) and sensor(s);

one or more linear hall effect magnet(s) and sensor(s);

an incremental encoder.

The means for determining the time derivative of the angle are conventional calculation means integrated into the control means.

iii. Variant with Measurement and/or Extraction of Physical Quantities from Means for Controlling the Motor Power Supply According to a third variant, the means 161 for determining the maximum rebound rotational frequency of the rotor comprise means 1615 for extracting and/or calculating physical quantities from the power supply control means, the means for determining the maximum rebound rotational frequency of the rotor being able to determine the maximum rotational frequency taking into account the physical quantities extracted and/or calculated.

Extraction means the recovery of the values of physical quantities which are accessible in real time in the vector control. Measurement means a measurement in real time of such physical quantities.

iii.1. Three-Phase Motor and Vector Control

The motor power supply control means 16 can implement a vector control, the motor of the impact wrench being three-phase.

FIG. 4 illustrates the diagram of such a vector control.

Such a control is well known to the person skilled in the art, it allows the transposition of the stator currents of a three-phase motor into 2 orthogonal components, one Iq, proportional to the electromagnetic torque of the motor and the other Id, representative of the flow and in general considered zero.

The vector control comprises sensors 171 for measuring the phase currents Ia, Ib, and Ic, and a sensor 170 of the angle of rotation of the rotor of the motor.

From the current setpoints Id and Iq, the vector control defines, by means of PID regulators 172, two voltage setpoints Ud and Uq. These voltage instructions, as well as the value of the angle of rotation of the rotor, are delivered to an inverse Clark/Park transform calculation module 173 whose outputs are conventionally connected to a battery of power transistors 174 which, being connected to a power supply 175, allows to apply the voltages Ua, Ub and Uc to the phases of the motor. This results in the intensities Ia, Ib, Ic in the phases of the motor.

The phase currents Ia, Ib and Ic as well as the angle of rotation measured are delivered to a module for calculating Clarke/Park Transforms 176 which determines two intensities Id and Iq. These intensities then enter the regulators 172 to define the voltage setpoints Uq and Ud.

Rotational Frequency from Clarke/Park Transforms

According to a variant, the calculation and/or extraction means are capable of extracting or measuring:

the intensities Id, Iq coming from the Clarke/Park 176 Transform calculation module at least one of the voltage setpoints Ud or Uq coming from the PID regulators 172.

The means for determining the maximum rebound rotational frequency of the rotor are capable of determining the maximum rotational frequency by taking account of the intensities Id, Iq coming from the Clarke/Park Transform calculation module 176 and from at least one of the voltage setpoints Ud or Uq coming from the PID regulators 172.

From the extraction or measurement of the voltage setpoint Uq, the means for determining the maximum rebound rotational frequency of the rotor are able to determine in real time the instantaneous rotational frequency ω in the following way:

$$U_q = E + RI_q - L\omega I_d - L\frac{dI_q}{dt}$$

where:

E is the back electromotive force of the motor

R is the resistance of the motor

L is the inductance of the motor

The back electromotive force E of the motor is proportional to the rotational frequency of the rotor w and oriented in the axis q of the rotating frame of the rotor of the motor. It is expressed as follows:

$$E = K_e\omega$$

Ke is a motor constant

It is possible to deduce therefrom:

$$U_q = K_e\omega + RI_q - L\omega I_d - L\frac{dI_q}{dt}$$

$$U_d = RI_d - L\omega I_q - L\frac{dI_d}{dt}$$

$$\omega = \frac{U_q - R.I_q + L\frac{dI_d}{dt}}{K_e - L.I_d}$$

Then, from the instantaneous rotational frequency ω determined in real time, the means for determining the maximum rotational frequency determine the maximum rotational frequency ωmax as being the maximum value of the instantaneous rotational frequency recorded in real time.

From the extraction or measurement of the voltage setpoint Ud, the means for determining the maximum rebound rotational frequency of the rotor are able to determine in real time the instantaneous rotational frequency ω in the following way:

$$\omega = \frac{R.I_d - U_d + L\dfrac{dI_d}{dt}}{L.I_q}$$

Then, from the instantaneous rotational frequency ω determined in real time, the means for determining the maximum rotational frequency determine the maximum rotational frequency ωmax as being the maximum value of the instantaneous rotational frequency recorded in real time.

This other formula for determining the rotational frequency may lead to a slightly different result from the previous one due to measurement errors. It can be used to confirm the previous result or detect a possible inconsistency in the determination of the rotational frequency.

The means for determining the maximum rebound rotational frequency of the rotor calculate in real time during each rebound the instantaneous rotational frequency ω of the rotor and record during each rebound the maximum value ωmax.

They then compare the value ωmax with the predetermined threshold of the end of the screw driving operation ωfin and order the stoppage of the screw driving operation in progress when ωmax reaches this threshold.

Rotational Frequency from Inverse Clarke and Park Transforms

The Clarke/Park inverse Transforms module 173 comprises:

means 1730 for calculating an inverse Park transform of the voltage setpoints Uq and Ud giving as a result voltages Uα and Uβ, means 1731 for calculating an inverse Clarke transform of the voltages Ua and Uβ giving as results voltages Ua, Ub and Uc, means 1732 for calculating a spatial vector from the voltages Ua, Ub and Uc giving voltages Ua', Ub' and Uc'.

Ua, Ub and Uc are referenced with respect to Neutral which is generally not electrically connected to the motor control.

Ua', Ub' and Uc' are the voltages actually applied to the phases with respect to the ground of the control device (inverter).

The Clarke/Park Transforms calculation module 176 comprises:

means 1760 for calculating a Clarke transform of the phase currents Ia Ib and Ic giving as result intensities Iα and Iβ, means 1761 for calculating a Park transform of the intensities Iα and Iβ giving the intensities Id and Iq.

According to a variant, the calculation and/or extraction means are capable of extracting or measuring the voltages Uα and Uβ and the intensities Iα and Iβ.

The means for determining the maximum rebound rotational frequency of the rotor are then capable of determining the maximum rotational frequency taking into account the voltages Uα and Uβ and said intensities Iα and Iβ by applying the following formulas:

$$U_\alpha = E_\alpha + RI_\alpha - L\frac{dI_\alpha}{dt}$$

$$U_\beta = E_\beta + RI_\beta - L\frac{dI_\beta}{dt}$$

-continued $$E_\alpha = U_\alpha - RI_\alpha + L\frac{dI_\alpha}{dt}$$

$$E_\beta = U_\beta - RI_\beta + L\frac{dI_\beta}{dt}$$

$$E_\alpha = K_e\omega\cos(\theta)$$

$$E_\beta = K_e\omega\sin(\theta)$$

$$\sqrt{E_\alpha^2 + E_\beta^2} = \sqrt{K_e^2\omega^2\cos(\theta)^2 + K_e^2\omega^2\sin(\theta)^2}$$

$$\sqrt{E_\alpha^2 + E_\beta^2} = K_e\omega\sqrt{\cos(\theta)^2 + \sin(\theta)^2}$$

$$\sqrt{E_\alpha^2 + E_\beta^2} = K_e\omega$$

$$\theta = \arctan\left(\frac{E_\beta}{E_\alpha}\right)$$

$$\omega = \frac{d\theta}{dt}$$

$$\omega = \frac{\sqrt{E_\alpha^2 + E_\beta^2}}{K_e}$$

The means for determining the maximum rebound rotational frequency of the rotor are able to calculate in real time during each rebound the rotational frequency ω of the rotor and to record during each rebound the maximum value ωmax.

They are able to then compare the value ωmax with a predetermined threshold of the end of the screw driving operation ωfin and to order the stoppage of the screw driving operation in progress when ωmax reaches this threshold.

Rotational Frequency from Phase Currents and Voltages

According to a variant, the calculation and/or extraction means are capable of measuring or extracting the phase currents and voltages Ia, Ib, Ic, Ua, Ub, Uc.

Then, for each phase n, the means for determining the maximum rebound rotational frequency of the rotor are able to calculate Ea, Eb and Ec, that is to say the shares of the back electromotive force of each phase, by applying the following formulas, by replacing n with a, b and c therein:

$$U_n = E_n + RI_n - L\frac{dI_n}{dt}$$

$$E_n = U_n - RI_n + L\frac{dI_n}{dt}$$

The means for determining the maximum rebound rotational frequency of the rotor are then able to determine Eα and Eβ from Ea, Eb and Ec, thanks to the Clarke transform, then to calculate in real time from Eα and Eβ as explained above, the instantaneous rotational frequency ω then the maximum rotational frequency ωmax recorded during the rebound.

They are able to then compare the value ωmax with a predetermined threshold of the end of the screw driving operation ωfin and to order the stoppage of the screw driving operation in progress when ωmax reaches this threshold.

iii.1.2. DC Motor

In a variant, the motor of the impact wrench is a DC motor at the terminals of which a voltage Um is applied and wherein a current Im flows.

Figures 6, 7, 8:
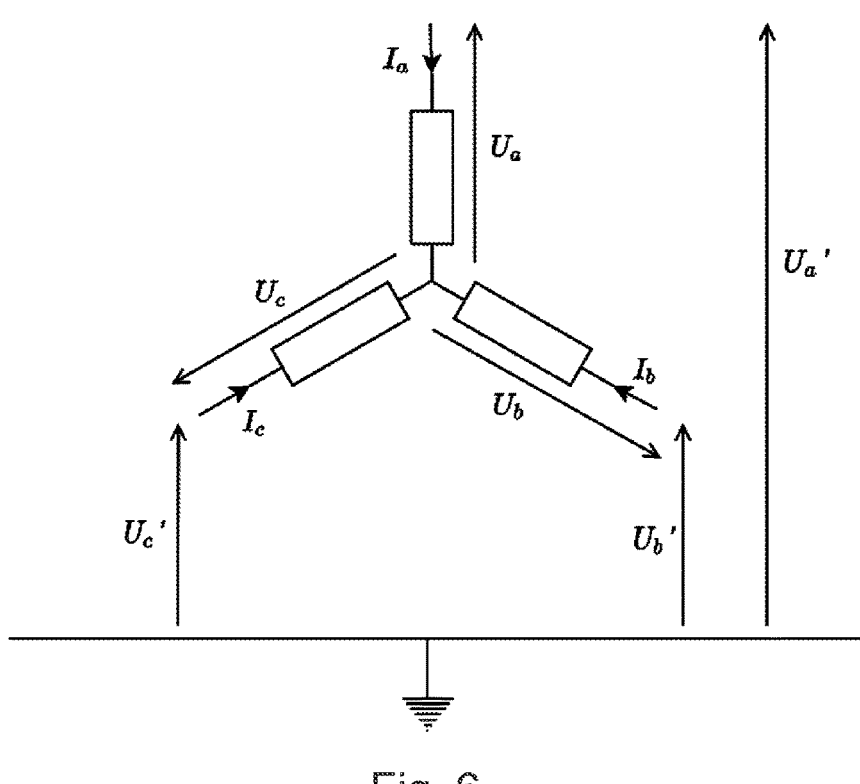
FIG. 6 illustrates the electrical model of a three-phase motor.
FIG. 7 illustrates a detail of the phase dipole of a three-phase motor.
FIG. 8 illustrates the electrical model of a DC motor.

FIG. 8 illustrates the model of a DC motor.

The physical quantities extracted and/or calculated by the calculation and/or extraction means then comprise:

the applied or measured current Im flowing in the motor, the voltage Um applied or measured at the terminals of the motor.

In this case, the means for determining the maximum rebound rotational frequency of the rotor are able to determine the maximum rotational frequency by applying the following formulas:

$$U_m = E + RI_m - L\frac{dI_m}{dt}$$

E: Counter Electromotive Voltage It is Proportional to the Speed of Rotation $$E = K_e\omega$$

$$U_m = K_e\omega + RI_m - L\frac{dI_m}{dt}$$

$$\omega = \frac{U_m - R.I_m + L\frac{dI_m}{dt}}{K_e}$$

Ke being a motor constant

The means for determining the maximum rebound rotational frequency of the rotor are able to calculate in real time during each rebound the rotational frequency ω of the rotor and to record during each rebound the maximum value ωmax.

They are able to then compare the value ωmax with a predetermined threshold of the end of the screw driving operation ωfin and to order the stoppage of the screw driving operation in progress when ωmax reaches this threshold.

iii.2. Control Variants

In variants, rather than vector control, the control of the motor could be of the 6-state or sine type.

iii.2.1. 6-Step Control

A 6-step control is more commonly referred to as a BLDC control.

Figure 9:
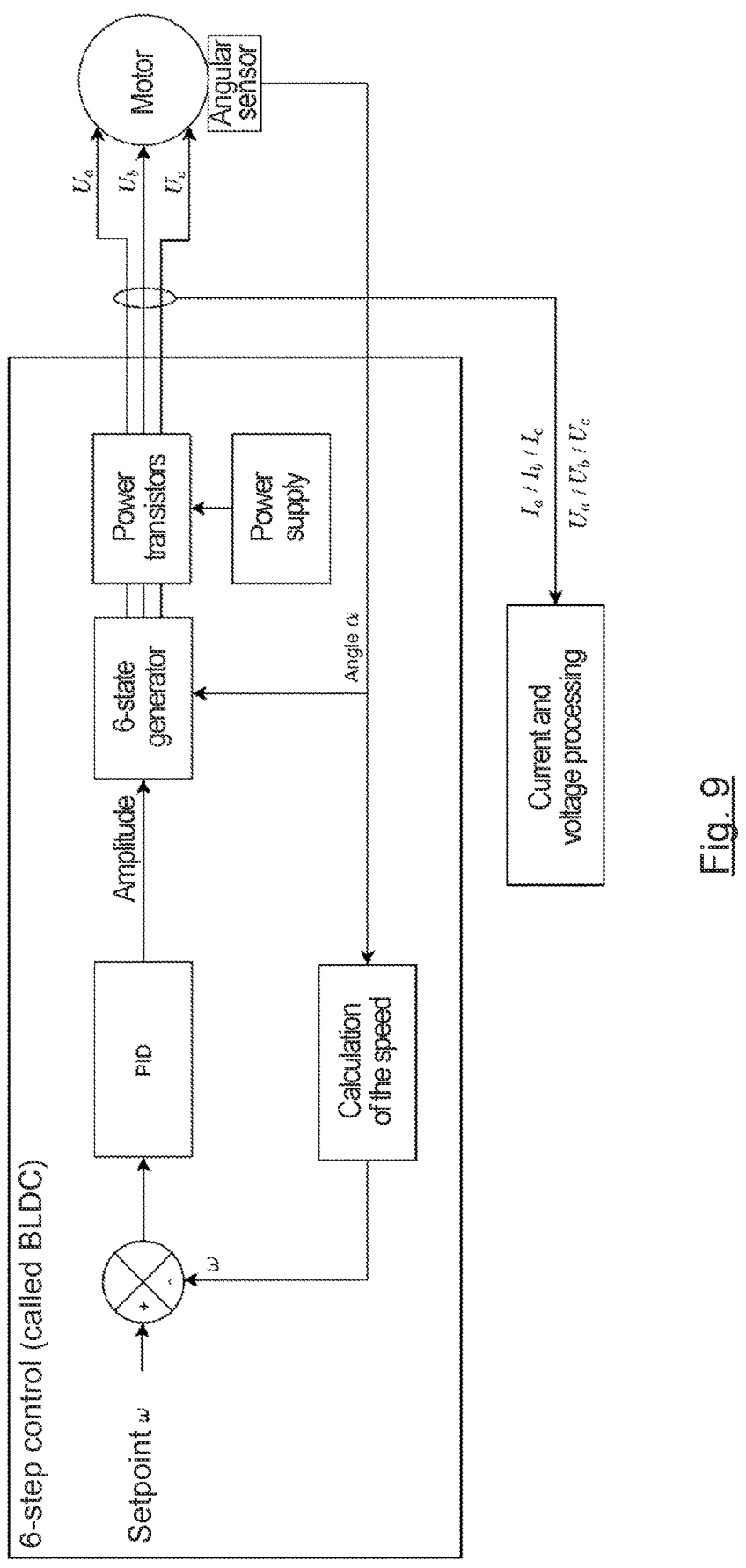
FIG. 9 illustrates the diagram of a 6-step control.

FIG. 9 illustrates the diagram of such a control.

In a manner which is conventional and known to the person skilled in the art, such a control applies at each instant, on the basis of a speed setpoint ω, a voltage Ua, Ub, Uc on only two of the three phases of the motor. The two powered phases are chosen according to the angular position of the motor rotor (angle α). The two chosen phases can be power supplied so that the ground is applied to the first of the two powered phases and the battery or mains voltage to the second of the two powered phases, or vice versa. This gives six combinations associated with six portions of 60° each in one electrical revolution of the motor. The applied voltage is modulated according to the difference between the measured speed and the speed setpoint. The phase that is not power supplied does not have a voltage imposed thereon, but a zero current.

As part of the implementation of a 6-step type control, the measurement and/or extraction means are able to measure in real time the applied voltages and the currents flowing in the two powered phases, the zero current applied and the voltage at the terminals of the unpowered phase. In other words, they are able to measure and/or extract phase voltages Ua, Ub and Uc and phase currents Ia, Ib and Ic.

Then, for each phase n, the means for determining the maximum rebound rotational frequency of the rotor are able to calculate Ea, Eb and Ec that is to say the shares of the back electromotive force of each phase, by applying the following formulas by replacing n by a, b and c:

$$U_n = E_n + RI_n - L\frac{dI_n}{dt}$$

$$E_n = U_n - RI_n + L\frac{dI_n}{dt}$$

The means for determining the maximum rebound rotational frequency of the rotor are then able to determine Eα and Eβ from Ea, Eb and Ec, thanks to the Clarke transform, then to calculate in real time from Eα and Eβ as explained above, the instantaneous rotational frequency ω then the maximum rotational frequency ωmax recorded during the rebound.

They are able to then compare the value ωmax with a predetermined threshold of the end of the screw driving operation ωfin and to order the stoppage of the screw driving operation in progress when ωmax reaches this threshold.

iii.2.2. Sine Control

Figure 10:
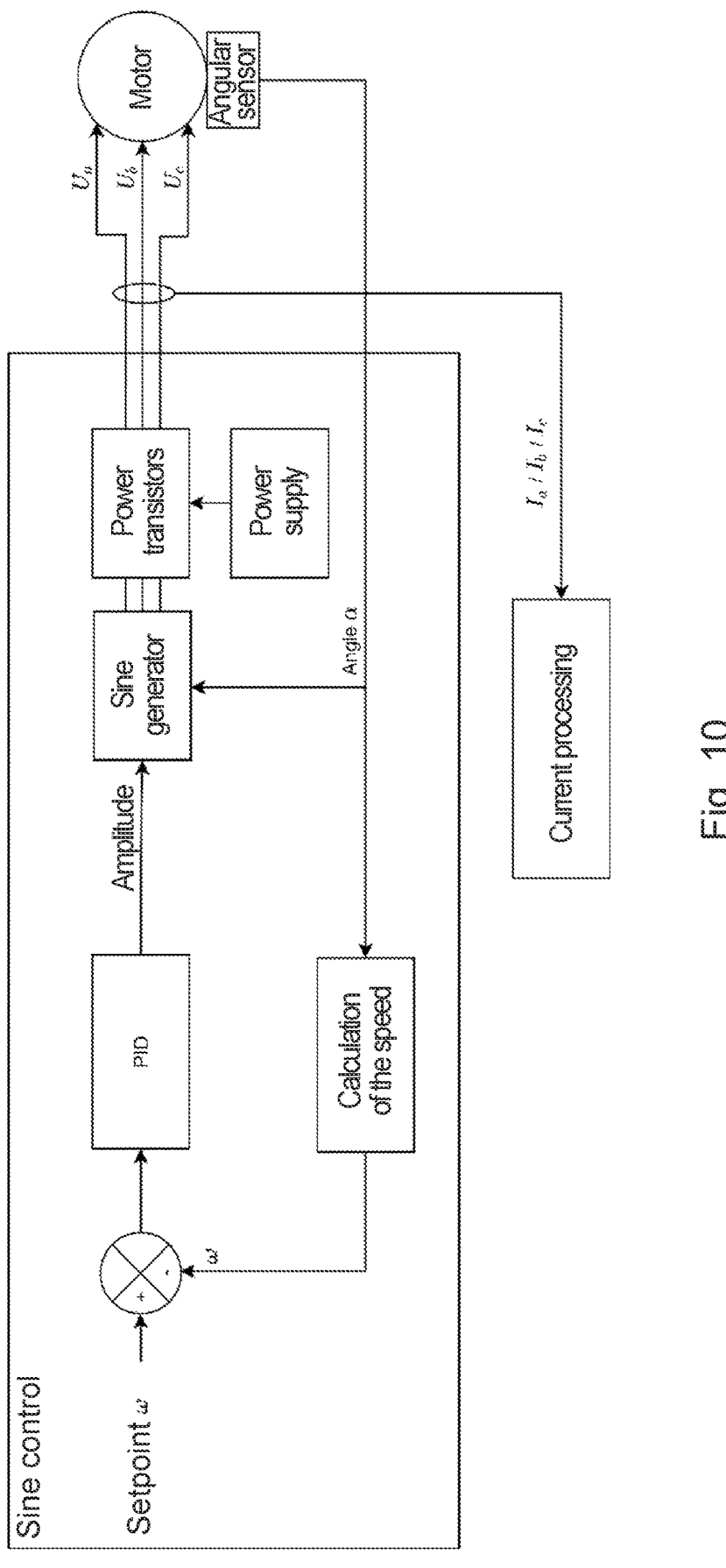
FIG. 10 illustrates the diagram of a sine control.

FIG. 10 illustrates the diagram of a sine type control.

Conventionally and known to the person skilled in the art, such a control is not based on the measurement of the current. The instantaneous speed ω of the motor is measured in real time, compared with a speed setpoint and the control generates a voltage amplitude setpoint to be applied to the motor to bring the measured speed to reach the speed setpoint. The voltage Ua, Ub, Uc applied to each of the phases is calculated from the amplitude and the angular position a of the rotor. Each of the phase voltages describes a sine function phase-shifted 120° relative to each other as the rotor makes an electrical revolution.

Within the framework of the implementation of a sine type control, the measurement and/or extraction means are able to measure in real time the voltages applied and the currents circulating in the phases of the motor. In other words, they are able to measure and/or extract phase voltages Ua, Ub and Uc and phase currents Ia, Ib and Ic.

Then, for each phase n, the means for determining the maximum rebound rotational frequency of the rotor are able to calculate Ea, Eb and Ec, that is to say the shares of the back electromotive force of each phase, by applying the following formulas by replacing n by a, b and c:

$$U_n = E_n + RI_n - L\frac{dI_n}{dt}$$

$$E_n = U_n - RI_n + L\frac{dI_n}{dt}$$

The means for determining the maximum rebound rotational frequency of the rotor are then able to determine Eα and Eβ from Ea, Eb and Ec thanks to the Clarke transform, then to calculate in real time from Eα and Eβ as explained above, the instantaneous rotational frequency ω then the maximum frequency of rotation ωmax as the maximum frequency of rotation recorded during the rebound.

They are able to then compare the value ωmax with a predetermined threshold of the end of the screw driving operation ωfin and to order the stoppage of the screw driving operation in progress when ωmax reaches this threshold.

5.2. Method

Figure 11:
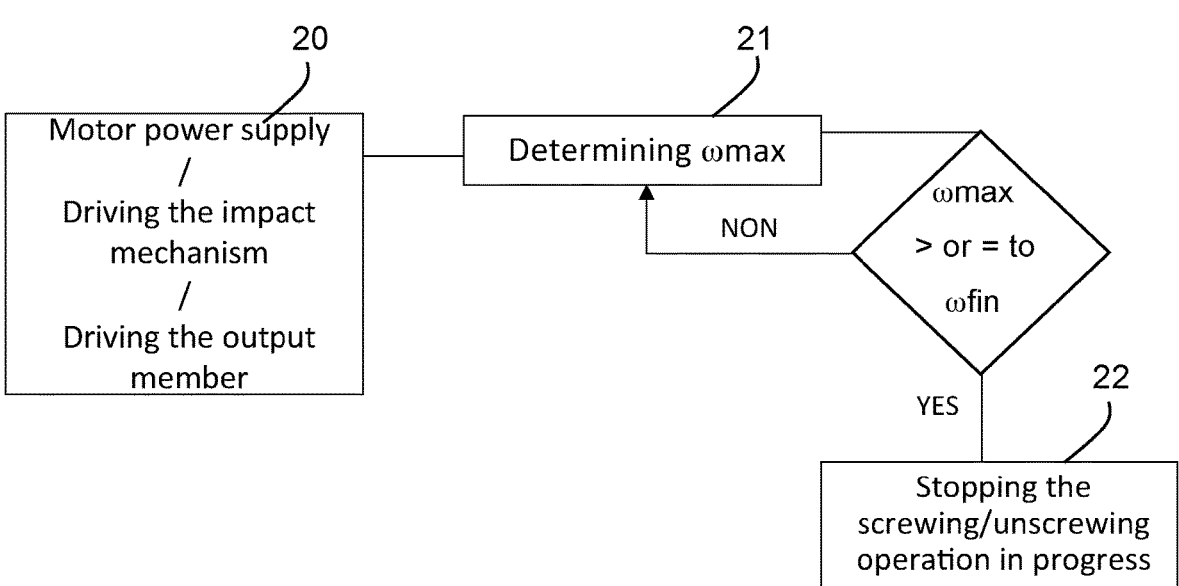
FIG. 11 illustrates a method according to an exemplary embodiment of the present disclosure.
Figure 12:
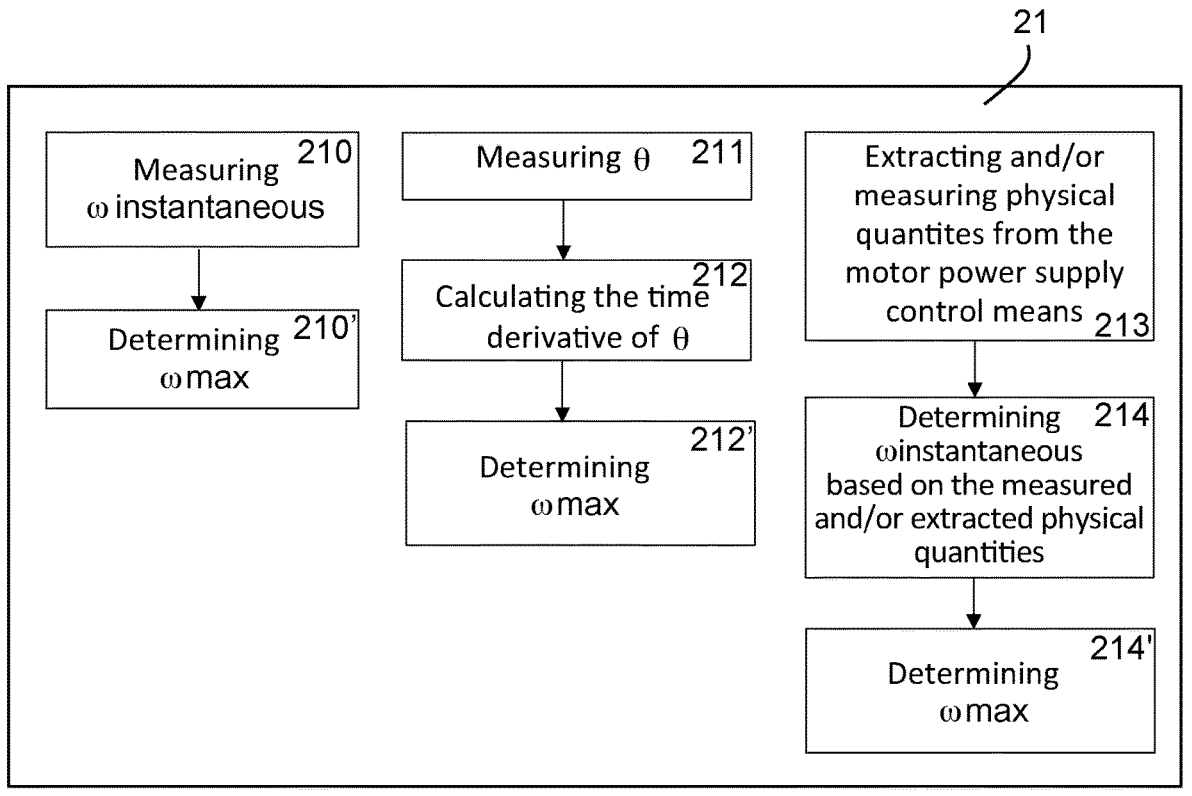
FIG. 12 illustrates different variants of a step of determining the maximum rebound rotational frequency of a rotor of a method according to an exemplary embodiment of the present disclosure.

In relation to FIGS. 11 and 12, an example of a method for controlling the torque applied when performing a screw driving operation by means of a screw driving device according to the present disclosure, such as those which have just been described as examples.

In general, such a method comprises a screwing or unscrewing phase 20, comprising a power supply of the motor inducing driving the impact mechanism by the rotor and periodically rotating the output member by the impact mechanism. The drive of the impact mechanism generates the occurrence of a plurality of successive impacts at the end of each of which the rotor rotates in a rebound in the opposite direction to the screw driving (screwing/unscrewing) operation in progress.

Such a method further comprises the following phases which are implemented continuously during the phase 20:

a step 21 of determining a maximum rotational frequency $\omega$max reached by the rotor during the rebound following the occurrence of each of the impacts in the impact mechanism, and a step 22 of stopping the screw driving operation when the maximum rotational frequency $\omega$max reaches a predetermined threshold $\omega$fin.

5.2.1. Variant with Speed Sensor

According to a variant, the step 21 of determining a maximum rotational frequency reached by the rotor during the rebound of the rotor comprises a step 210 of measuring in real time the instantaneous rotational frequency $\omega$ by means of the speed sensor.

During the screw driving operation, this rotational frequency is continuously measured in real time.

Step 21 further comprises a step 210' of detecting the maximum value of the instantaneous rotational frequency $\omega$ during the rebound, this value being equal to the maximum frequency of rotation $\omega$max during the rebound of the rotor.

5.2.2. Variant with Angle Sensor

According to a variant, step 21 of determining a maximum rotational frequency reached by the rotor during the rebound comprises:

a step 211 of measuring the instantaneous angle of rotation a of the rotor as a function of time, and a step 212 of determining the time derivative of the angle $\theta$ measured in the angle measurement step, this derivative corresponding to the instantaneous rotational frequency of the rotor $\omega$;

a step 212' of determining the maximum rebound frequency $\omega$max of the rotor during the rebound as the maximum instantaneous speed recorded during the rebound, which is equal to the maximum of the time derivative of the angle $\theta$.

During the screw driving operation, these steps are implemented in real time on a continuous basis.

5.2.3. Variant with Measurement and/or Extraction of Physical Quantities from Means for Controlling the Motor Power Supply According to a variant, the step 21 of determining the maximum rebound rotational frequency of the rotor comprises:

a step 213 of extracting and/or calculating physical quantities from the power supply control means, a step 214 of determining the instantaneous rebound rotational frequency $\omega$ of the rotor taking into account the physical quantities extracted and/or calculated and a step 214' of determining the maximum rebound rotational frequency $\omega$max of the rotor as the maximum value of the instantaneous speed $\omega$ recorded during the rebound.

During the screw driving operation, these steps are implemented in real time on a continuous basis.

i. Three-Phase Motor and Vector Control

The examples of modes for determining the rotational frequency of the rotor described below apply in the case of the implementation of vector control of a three-phase motor.

The vector control allows the transposition of the stator currents of a three-phase motor into 2 orthogonal components, one Iq, proportional to the electromagnetic torque of the motor and the other Id, representative of the flow and generally considered zero.

The vector control induces:

from the current setpoints Id and Iq, the definition, by means of PID regulators 172, of two voltage setpoints Ud and Uq. These voltage setpoints, as well as the value of the angle of rotation of the rotor, are delivered to an inverse Clark/Park transform calculation module 173 whose outputs are conventionally connected to a battery of power transistors 174 which, being connected to a power supply 175, allows to apply the voltages Ua, Ub and Uc to the phases of the motor. This results in the intensities Ia, Ib, Ic in the phases of the motor;

the delivery of the phase currents Ia, Ib and Ic as well as the angle of rotation measured to a Clarke/Park transform calculation module 176, which determines two intensities Id and Iq. These intensities then enter the regulators 172 to define the voltage setpoints Uq and Ud.

During the screw driving operation, these steps are implemented in real time on a continuous basis.

i.1. Rotational Frequency from Clarke/Park Transforms

According to a variant wherein the rotational frequency of the motor is determined from the Clarke/Park transforms, the step 213 of measuring and/or extracting physical quantities from the motor power supply control means comprises measuring and/or extracting:

of the two intensities Iq, Id, and at least one of said voltage setpoints Ud or Uq.

The step 214 of determining the maximum rebound rotational frequency of the rotor then takes into account the intensities Id, Iq and at least one of the voltage setpoints Ud or Uq to determine the maximum rebound rotational frequency of the rotor as explained in detail above in connection with the device.

i.2. Rotational Frequency from the Inverse Clarke and Park Transforms

A vector control also induces in particular:

the calculation of an inverse Park transform of the voltage setpoints Uq and Ud giving as a result voltages U$\alpha$ and U$\beta$, the calculation of a Clarke transform of the phase currents Ia Ib and Ic giving as result intensities I$\alpha$ and I$\beta$.

During the screw driving operation, these steps are implemented in real time on a continuous basis.

According to a variant wherein the motor rotational frequency is determined from the inverse Clarke/Park transforms, the step 213 of extracting physical quantities from the motor supply control means comprises measuring and/or extracting:

voltages U$\alpha$ and U$\beta$, and intensities I$\alpha$ and I$\beta$.

The step of determining the maximum rebound rotational frequency of the rotor then takes into account the voltages U$\alpha$ and UB and the intensities I$\alpha$ and I$\beta$ to determine the maximum rebound rotational frequency of the rotor as explained in detail above in relation to the device.

i.3. Rotational Frequency from Phase Currents and Voltages

According to a variant wherein the rotational frequency of the motor is determined from the phase currents and voltages of a vector-controlled motor, the step 213 of measuring and/or extracting physical quantities from the control means of the motor power supply comprises measuring and/or extracting:

currents Ia, Ib, Ic, and phase voltages Ua, Ub, Uc.

The step 214 of determining the maximum rebound rotational frequency comprises calculating Ea, Eb and Ec by applying the following formulas where n is a, b or c:

$$U_n = E_n + RI_n - L\frac{dI_n}{dt}$$

$$E_n = U_n - RI_n + L\frac{dI_n}{dt}$$

The step 214 of determining the maximum rebound rotational frequency then comprises calculating E$\alpha$ and E$\beta$ from Ea, Eb and Ec thanks to the Clarke transform, then calculating in real time from E$\alpha$ and E$\beta$, the instantaneous rotational frequency $\omega$ then the maximum rotational frequency $\omega$max recorded during the rebound.

ii. DC Motor

In the case of the implementation of a DC motor, the step 213 of measuring and/or extracting physical quantities from the motor supply control means comprises measuring and/or extracting:

applied or measured current Im flowing in the motor, the voltage Um applied or measured at the terminals of the motor.

Step 214 of determining the maximum rebound rotational frequency of the rotor then takes into account the voltage Um and U and the intensity Im to determine the maximum rebound rotational frequency of the rotor as explained in more detail above in relation to the device.

iii. 6-Step Control Motor

According to a variant implementing a 6-step control, step 213 of measuring and/or extracting physical quantities from the motor power supply control means, and step 214 of determining the maximum rebound rotational frequency are identical to those described in § i.3. Rotational frequency from phase currents and voltages.

iv Sine-Controlled Motor

According to a variant implementing a sine control, step 213 of measuring and/or extracting physical quantities from the motor power supply control means, and step 214 of determining the maximum rotational frequency rebound are identical to those described in § i.3. Rotational frequency from phase currents and voltages.

An exemplary embodiment of the disclosure provides an effective solution to at least some of the various problems of the prior art.

An exemplary embodiment of the disclosure provides an electric impact wrench with a rebounding impact mechanism which allows to perform a screw driving operation reliably and efficiently.

An exemplary embodiment of the disclosure provides such an impact wrench which allows to effectively control the tightening torque delivered during a screw driving operation.

An exemplary embodiment of the disclosure provides such an impact wrench which allows to stop a screw driving operation when the tightening torque reaches the desired torque.

An exemplary embodiment of the disclosure provides such an impact wrench which is simple in design and to implement.

Although the present disclosure has been described with reference to one or more examples, workers skilled in the art will recognize that changes may be made in form and detail without departing from the scope of the disclosure and/or the appended claims.

The invention claimed is:

1. A method for controlling tightening torque applied during a screw driving operation by a screw driving device comprising:

an electric motor provided with a rotor;

an output member capable of being rotated;

a rebounding impact mechanism rigidly connected to said rotor and to said output member, said method comprising:

supplying said motor with power, inducing driving said impact mechanism by said rotor and periodically rotating said output member by said impact mechanism, the driving of said impact mechanism generating a plurality of successive impacts at an end of each of which said rotor rotates in a rebound in the opposite direction to the screw driving operation, determining a maximum rotational frequency reached by said rotor during the rebound following each of said impacts in said impact mechanism, and stopping said screw driving operation when said maximum rotational frequency reaches a predetermined threshold corresponding to a predetermined tightening torque level, wherein supplying said motor with power comprises using a controller to control the supply power to the motor, said determining said maximum rebound rotational frequency reached by said rotor during the rebound of said rotor comprising:

extracting and/or calculating physical quantities from said controller, and determining said maximum rebound rotational frequency reached by said rotor during the rebound of said rotor taking into account said extracted and/or calculated physical quantities.

2. The method according to claim 1 wherein said determining a maximum rotational frequency reached by said rotor during the rebound of said rotor comprises determining an instantaneous rotational frequency reached by said rotor during the rebound following each of said impacts in said impact mechanism, said maximum rotational frequency corresponding to the maximum value of the instantaneous rotational frequency following each impact.

3. The method according to claim 1 wherein said determining a maximum rotational frequency reached by the rotor during the rebound of said rotor comprises measuring said rotational frequency by a speed sensor.

4. The method according to claim 1 wherein said determining a maximum rotational frequency reached by said rotor during the rebound comprises:

measuring an angle of rotation of said rotor as a function of time by an angle sensor, and a determining a time derivative of the angle measured in said measuring the angle.

5. The method according to claim 1, wherein said power supply of said motor implements a vector control generating two voltage setpoints Ud and Uq from a current setpoint Id, a current setpoint Iq, a measurement of the three phase currents Ia, Ib and Ic and a measurement of the angular position of the rotor.

6. The method according to claim 5 wherein said vector control comprises:

calculation of Clarke/Park transforms from said phase currents Ia, Ib and Ic and the angular position of the rotor giving as a result two intensities Iq, Id, extraction of at least one of said voltage setpoints Ud or Uq, said determining said maximum rotational frequency reached by said rotor during the rebound of said rotor taking into account said intensities Id, Iq and at least one of said voltage setpoints Ud or Uq.

7. The method according to claim 5 wherein said vector control comprises:

the calculation of an inverse Park transform of said voltage setpoints Uq and Ud giving as a result voltages Uα and Uβ, and the calculation of a Clarke transform of said phase currents Ia Ib and Ic giving as a result intensities Iα and Iβ, said determining said maximum rebound rotational frequency reached by said rotor during the rebound of said rotor taking into account said voltages Uα and Uβ and said intensities Iα and Iβ.

8. The method according to claim 1, wherein said power supply of said motor implements a brushless direct current (BLDC) control.

9. The method according to claim 1, wherein said power supply of said motor implements a sine control.

10. The method according to claim 1, said motor being a direct current (DC) motor and said extracted and/or calculated physical quantities comprising:

an applied or measured current flowing in said motor, a voltage applied or measured at the terminals of said motor.

11. The method according to claim 1, said motor being three-phase and said extracted and/or calculated physical quantities comprising:

at least two of the currents applied or measured in the phases of said motor, voltages applied or measured at the phases of said motor.

12. A control device for controlling tightening torque applied by a screw driving device allowing to perform screw driving operations, said screw driving device comprising:

an electric motor provided with a rotor;

an output member capable of being rotated;

a rebounding impact mechanism rigidly connected to said rotor and to said output member, said control device comprising:

a controller configured to control the power supply of said motor to induce driving said impact mechanism by said rotor and periodically rotate said output member by said impact mechanism, the driving of said impact mechanism generating a plurality of successive impacts at an end of each of which said rotor rotates in a rebound in the opposite direction to the screw driving operation, means for determining a maximum rotational frequency reached by said rotor during the rebound following each of said impacts in said impact mechanism, and a controller configured to generate stoppage of a screw driving operation in progress when said maximum rotational frequency reaches a predetermined threshold corresponding to a predetermined tightening torque level, wherein said means for determining said maximum rotational frequency reached by said rotor during the rebound of said rotor comprise means for extracting and/or calculating physical quantities from said controller configured to control the power supply of said motor, said means for determining said maximum rotational frequency reached by said rotor during the rebound of said rotor being configured to determine said maximum rotational frequency taking into account said extracted and/or calculated physical quantities.

13. The device according to claim 12, wherein said means for determining a maximum rotational frequency reached by said rotor during the rebound of said rotor comprise means for determining an instantaneous rotational frequency reached by said rotor during the rebound following each of said impacts in said impact mechanism, said maximum rotational frequency corresponding to the maximum value of the instantaneous rotational frequency following each impact.

14. The device according to claim 12 wherein said means for determining a maximum rotational frequency reached by the rotor during the rebound of said rotor comprise a speed sensor.

15. The device according to claim 12 wherein said means for determining a maximum rotational frequency reached by said rotor during the rebound comprise:

means for measuring an angle of rotation of said rotor as a function of time, and means for determining a time derivative of the angle measured by said means for measuring the angle.

16. The device according to claim 12, wherein said controller configured to control the power supply of said motor implements a vector control capable of generating two voltage setpoints Ud and Uq from a flow setpoint Id and a torque setpoint Iq, and three phase currents Ia, Ib and Ic from said voltage setpoints Ud and Uq.

17. The device according to claim 16, wherein said vector control comprises means for calculating Clarke/Park transforms from said phase currents Ia, Ib and Ic giving as a result two intensities Iq, Id, said calculation and/or extraction means being capable of extracting at least one of said voltage setpoints Ud or Uq, said means for determining said maximum rotational frequency reached by said rotor during the rebound of said rotor being capable of determining said maximum rotational frequency taking into account said intensities Id, Iq and at least one of said voltage setpoints Ud or Uq.

18. The device according to claim 16, wherein said vector control comprises means for calculating an inverse Park transform of said voltage setpoints Uq and Ud giving as a result voltages Uα and Uβ, and means for calculating a Clarke transform of said phase currents Ia Ib and Ic resulting in intensities Ia and IB, said means for determining said maximum rotational frequency reached by said rotor during the rebound of said rotor being capable of determining said maximum rotational frequency taking into account said voltages Uα and Uβ and said intensities Iα and Iβ.

19. The device according to claim 12, wherein said controller configured to control the power supply of said motor implements a brushless direct current (BLDC) control.

20. The device according to claim 12, wherein said controller configured to control the power supply of said motor implements a sine control.

21. The device according to claim 12, said motor being a DC motor and said physical quantities extracted and/or calculated by said calculation and/or extraction means comprising:

the applied or measured current flowing in said motor, the voltage applied or measured at the terminals of said motor.

22. The device according to claim 12, said motor being three-phase and said physical quantities extracted and/or calculated by said calculation and/or extraction means comprising:

at least two of the currents applied or measured in the phases of said motor, voltages applied or measured at the phases of said motor.

23. A screw driving device comprising:

an electric motor provided with a rotor;

an output member capable of being rotated;

a rebounding impact mechanism rigidly connected to said rotor and to said output member; and a control device comprising:

a controller configured to control the power supply of said motor able to induce driving said impact mechanism by said rotor and periodically rotating said output member by said impact mechanism, the driving of said impact mechanism generating a plurality of successive impacts at an end of each of which said rotor rotates in a rebound in the opposite direction to the screw driving operation, means for determining a maximum rotational frequency reached by said rotor during the rebound following each of said impacts in said impact mechanism, and a controller configured to generate stoppage of a screw driving operation in progress when said maximum rotational frequency reaches a predetermined threshold corresponding to a predetermined tightening torque level, wherein said means for determining said maximum rotational frequency reached by said rotor during the rebound of said rotor comprise means for extracting and/or calculating physical quantities from said controller configured to control the power supply of said motor, said means for determining said maximum rotational frequency reached by said rotor during the rebound of said rotor being configured to determine said maximum rotational frequency taking into account said extracted and/or calculated physical quantities.

24. A non-transitory computer readable medium comprising a computer program product stored thereon comprising code instructions which when executed by a computer of a control device configure the control device execute a method of controlling tightening torque applied during a screw driving operation by a screw driving device comprising:

an electric motor provided with a rotor;

an output member capable of being rotated;

a rebounding impact mechanism rigidly connected to said rotor and to said output member, said method comprising:

supplying said motor with power inducing driving said impact mechanism by said rotor and periodically rotating said output member by said impact mechanism, the driving of said impact mechanism generating a plurality of successive impacts at an end of each of which said rotor rotates in a rebound in the opposite direction to the screw driving operation, determining a maximum rotational frequency reached by said rotor during the rebound following each of said impacts in said impact mechanism, and stopping said screw driving operation when said maximum rotational frequency reaches a predetermined threshold corresponding to a predetermined tightening torque level, wherein supplying said motor with power comprises using a controller to control the supply power to the motor, said determining said maximum rebound rotational frequency reached by said rotor during the rebound of said rotor comprising:

extracting and/or calculating physical quantities from said controller, and determining said maximum rebound rotational frequency reached by said rotor during the rebound of said rotor taking into account said extracted and/or calculated physical quantities.

* * * * *